June 23, 1964 W. J. DE GROFT 3,137,886
CAP DEVICE FOR BALL-TYPE FLUID DISPENSER
Filed April 15, 1963

Inventor:
Walter J. De Groft
By: Hofgren, Wegner, Allen,
Stellman & McCord
Attorneys

3,137,886
CAP DEVICE FOR BALL-TYPE FLUID DISPENSER

Walter J. De Groft, Glen Ellyn, Ill., assignor, by mesne assignments, to Sanford Research Company, Bellwood, Ill., a corporation of Illinois
Filed Apr. 15, 1963, Ser. No. 273,201
2 Claims. (Cl. 15—572)

This invention relates to a cap device for a fluid dispenser, and more particularly to a unique closure cap adapted to hermetically seal a ball-type, roll-on dispenser when not in use.

Ball-type dispensers have commonly been used to dispense small amounts of fluids such as perfumes, deodorants, stamping ink, and the like. Such dispensers include a fluid container surmounted by a bearing which partially encloses and loosely embraces a styrene ball to afford free rotation to the ball to apply fluid to the desired surface. In manufacture, the tolerances between the styrene ball and the bearing, usually of plastic, are not closely maintained so that leakage and evaporation about the ball during storage is a serious problem.

In prior ball-type dispensers, a solution to the leakage problem has been attempted in either of two ways. In one approach, the closure cap is caused to bear upon the exposed end of the ball to force the opposite end of the ball downwardly against the lower end of the bearing. In such structures, even assuming a tight seal can be effected, the fluid above the seal and around the ball often flows outwardly into the interior of the closure cap and about the bearing.

In a second approach, horizontal forces are exerted on the side walls of the plastic bearing in an attempt to collapse the resilient plastic bearing into intimate sealing engagement about the ball. This approach also has serious defects. The horizontal pressure tends to force fluid remaining between the ball and the side walls outwardly into the cap; and not infrequently, it causes adherence between the ball and the inner annular wall of the bearing when the fluid dries. The "pumping action" exerted by the horizontal forces from the closure cap against the resilient side walls of the bearing is especially undesirable when the fluid is a stamp pad ink or other staining substance.

When the fluid to be dispensed is ink for stamp pads, the leakage problem is further aggravated. Since ink is hygroscopic in nature, it absorbs moisture from the air and seriously alters the viscosity and consistency of the ink in the container. Furthermore, ink becomes diluted adjacent the ball and its bearing and ultimately finds its way about the interior of the closure cap and around the outside of the bearing. Thus, when the closure cap is removed, drops of ink may unexpectedly escape and fall upon adjacent persons or objects. A significant portion of such "leakers" have been returned in the past to the manufacturer by users in spite of inspection safeguards. The "leakers" have been permanently cured by utilizing the structure of the present invention.

The structure of the present invention obviates the deficiencies of the prior devices by providing sealing engagement on an outer minor portion of the ball along a substantially circular line of contact between the free end of the bearing and the ball. By providing sealing contact substantially along a circular line, "pumping action" is completely avoided so that there is no tendency for the closure cap to force the fluid outwardly into the interior of the cap when the cap is secured to the container. In addition, the closure cap is spaced from the bearing and ball above and below the line of circular contact to minimize contact of fluid on the ball with the closure cap, and to minimize adherence between the bearing and the ball. Furthermore, the closure cap of the present invention is provided with a relatively sharply tapered inner camming surface to compensate automatically for minor tolerance discrepancies between the ball and its bearing.

The invention is illustrated in a preferred embodiment in the accompanying drawings, in which.

Figure 1:
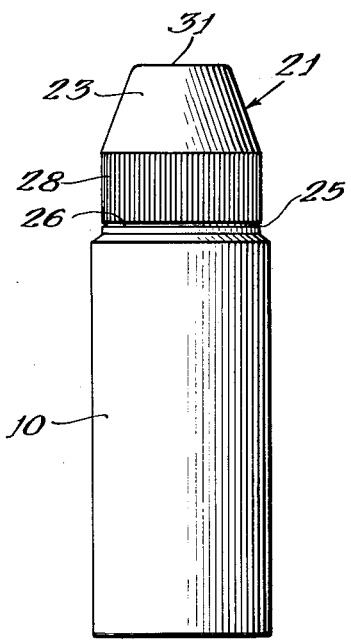
FIG. 1 is a side elevational view of the ball-type dispenser with the closure cap shown fully threadably advanced upon the container.

In the embodiment illustrated, the dispenser includes a bottle or container 10, preferably formed of polyethylene or similar plastic, having a neck portion 11 provided with exterior threads 12. The neck portion 11 may have an inner constricted portion forming an opening 13 through which fluid in the container may flow. A seat 14 is located adjacent the outer end of the constricted portion for supporting a dispensing ball 15, preferably formed of styrene or similar material.

A bearing, generally designated 16, of resilient plastic extends upwardly from the seat 14 and has an encompassing annular side wall 17 whose inner annular surface 18 is normally spaced from the lateral surface of the ball-type valve to afford an annular chamber 34. In other words, the bearing 16 loosely embraces the ball 15 to permit rotation of the ball therein during a fluid dispensing operation. The container 10, its neck portion 11 and the bearing 16 are preferably integrally formed of one-piece plastic construction.

Figure 2:
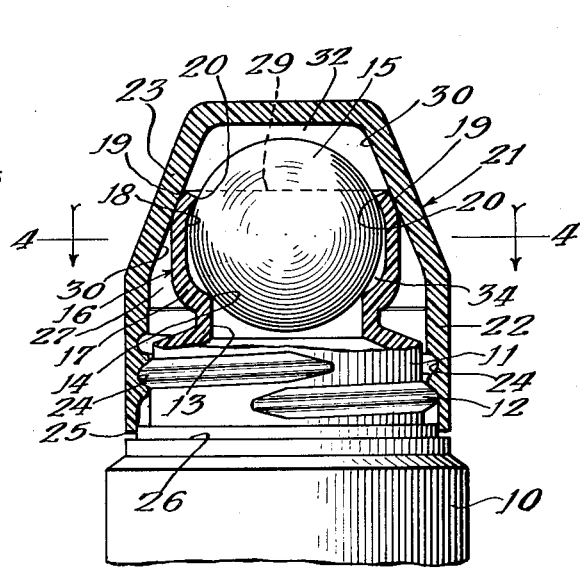
FIG. 2 is an enlarged broken fragmentary view partly in section illustrating the tapered inner camming surface of the cap forcing the lip of the bearing into sealing engagement substantially along a line of circular contact upon the outer portion of the ball valve.
Figure 4:
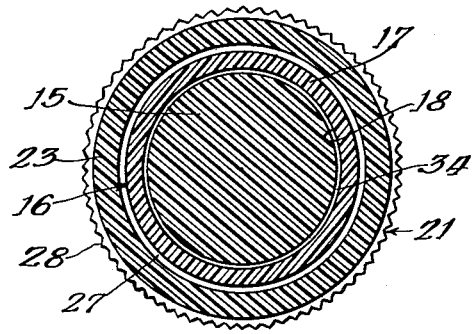
FIG. 4 is a sectional view taken as indicated along line 4—4 of FIG. 2.
Figure 3:
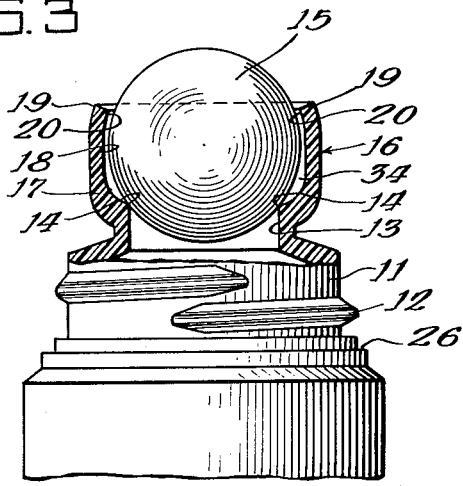
FIG. 3 is an enlarged broken fragmentary view partly in section with the closure cap removed to illustrate the spacing between the ball and the side walls of the bearing when the dispenser is ready for use.

As best seen in FIGS. 2 and 3, the side wall 17 of the bearing 16 preferably encompasses substantially more than one-half of the ball 15 so that only a minor portion of the upper half of the ball 15 projects beyond the free end of the side wall 17. The free end of the side wall 17 is tapered inwardly normally to retain the ball 15 within the bearing during operation. Since the side wall 17 is formed of resilient plastic, the ball 15 is assembled in its bearing by merely forcing the ball through the tapered open end of the bearing 16.

The tapered portion of the side wall 17 terminates in an inner annular lip or edge 20 and an outer annular camming portion 19. As will subsequently be explained, peripheral forces, exerted upon the camming portion 19 and directed generally toward the center of the ball 15, will cause the annular lip 20 to be moved into sealing engagement with the ball 15 substantially along a line of circular contact 29 on the outer minor portion of the ball 15 to seal hermetically all fluid contents within the bearing 16 and the container 10.

In order to effect the sealing referred to above, closure means are provided cooperatively to coact with the camming portion 19 and annular lip 20. To this end, and as best shown in FIG. 2, a closure cap, generally designated 21, is provided for enclosing the ball 15 when the dispenser is not in use. The closure cap 21 is so constructed and arranged in relation to the sealing lip 20 that camming portions on each member can be brought into cooperative engagement when the closure cap is threadably advanced upon the container 10 so as to force the sealing lip 20 radially inwardly against the ball 15.

The closure cap 21 is cup-shaped and comprises a generally cylindrical wall portion 22 adjacent the open end and a tapered end portion 23 at the closed end. The inner surface of the cylindrical wall portion is provided with spiral threads 24 which are adapted to threadably engage the threads 12 on the neck 11 of the contained 10. The annular end 25 of the cap 21 preferably terminates short of the annular shoulder 26 of the container 10 when the cap is fully threaded upon the neck 11.

The cylindrical wall portion 22 adjacent the bearing side wall 17 is substantially spaced therefrom to afford an enlarged inner annular chamber 27 of irregular cross section. The purpose of the spacing 27 is to minimize the contact of the inner wall of cap 21 with the bearing 16 so as not to collapse the bearing side wall 17 and to prevent the carrying of fluid downwardly from the free end of the bearing 16 on the outside of the bearing side wall 17. The outer surface of the cylindrical wall portion 22 may be provided with a number of serrations 28 to assist in threadably engaging or disengaging the cap 21 from the container 10.

The upper tapered portion 23 of the cap 21 is preferably frusto-conical in shape. The inner conical surface 30 is preferably tapered inwardly rather sharply at approximately an angle of 20° and terminates in a bottom wall 31 of the cap 21, which bottom wall 31 defines an enclosed chamber 32 with the exposed surface of the ball 15, the lip 20 and the conical surface 30. Again, the chamber 32 affords adequate clearance so that contact is avoided between the cap 21 and fluid contents remaining on the exposed ball 15 after a dispensing operation.

The inner conical surface 30 and the outer annular camming portion 19 form a pair of cooperating members for moving the annular lip 20 into sealing engagement with the ball 15 along a thin line of circular contact 29. When the cap 21 is threadably advanced on the container 10, forces from the surface 30 are transmitted to the camming portion 19 about its entire periphery to urge the wiping lip 20 into sealing contact with an outer minor portion of the ball 15. The angle of contact between the surface 30 and the portion 19 causes the force to be exerted substantially toward the center of the ball 15 to collapse only the marginal end portion adjacent the wiping lip toward the ball and to leave the remainder of the side wall 17 of the bearing 16 undeformed.

Thus, it can be seen that the structure of the present invention exerts no squeezing action upon the side wall 17, which squeezing or pumping action tends to force fluids from within the annular chamber 34 outwardly of the bearing into the chamber 32. Furthermore, the inner conical surface 30 is of substantial extent so that the cap 21 accommodates itself readily to slight dimensional differences inherent in plastic balls and bearings, such as 15 and 16, from the normal manufacturing processes. Thus, with one ball and bearing combination to effect sealing, the cap 21 may be threadably advanced farther on the neck of the container than with a second ball and bearing combination; but caps and containers embodying the principle and structure of the present invention will provide hermetic sealing in both such ball and bearing combinations.

To operate the dispenser, it is merely necessary to remove the cap 21, invert the container, and roll the exposed end of the ball 15 across the surface where the fluid is to be laid down. The fluid from within the container 10 flows by gravity through the neck 13, into the annular chamber 34, and about the ball 15. The ball 15 rotates within its bearing because of frictional contact with the surface where the fluid is to be laid down, and the rotation of the ball carries the fluid on its spherical surface outwardly of the bearing to the desired location. When the dispensing operation is completed, the cap 21 is replaced on the container once more to seal the fluid within the bearing 16 and container 10, leaving only a negligible portion of fluid on the minor portion of the ball protruding from the bearing.

The foregoing detailed description is given for clearness of understanding only, and no unnecessary limitations should be understood therefrom, for some modifications will be obvious to those skilled in the art.

I claim:

1. A cap and dispenser assembly for fluids comprising: a container for fluid having an open upper end affording a ball-type support; a dispensing ball adapted to rest upon said support; a bearing having a continuous side wall extending upwardly from said support loosely to encompass said ball to afford an annular chamber providing free rotation of the ball in the bearing, said side wall having a constricted free end portion embracing a part of the outer half of the ball for retaining said ball within the bearing, the free end portion being provided with an annular resilient lip adapted to be moved inwardly into continuous annular line contact with said outer half of the ball to seal the fluid within the bearing and the container; and a closure cap adapted to be detachably secured to the container to enclose the ball and bearing, said cap being provided with a sharply inwardly tapered inner camming surface for peripherally engaging only the free end portion of the side wall substantially in line contact to force the annular resilient lip into sealing engagement against the outer half of the ball along said continuous annular line contact when the cap is secured to the container, the camming surface being of substantial extent so as to effect sealing engagement with balls and bearings of varying dimensional tolerances and to extend above and below said free end portion in entirely spaced relation from the ball and the bearing.

2. A cap and dispenser assembly for fluids as specified in claim 1, in which the ball-type support is formed to receive a part of the inner half of the dispensing ball in sealing relation whereby a dual seal on the dispensing ball is formed above and below the annular chamber at the free end portion of the bearing side wall and at the ball-type support when the closure cap is secured to the container.

References Cited in the file of this patent

UNITED STATES PATENTS

| | | |
|---|---|---|
| 2,749,566 | Thomas | June 12, 1956 |
| 2,937,392 | Williams | May 24, 1960 |
| 3,090,987 | Rueckberg | May 28, 1963 |